United States Patent Office 2,750,285
Patented June 12, 1956

2,750,285

PROCESS FOR EXTRACTING NICKEL FROM LOW GRADE ORES

Rene Perrin, Paris, France, assignor to Societe d'Electro-Chimie d'Electro-Metallurgie et des Acieries Electriques d'Ugine, Paris, France No Drawing. Application July 22, 1952,
Serial No. 300,355

Claims priority, application France August 1, 1951

2 Claims. (Cl. 75—133)

This invention relates to a process for extracting nickel from low grade nickel ores containing an oxidic compound of nickel. There are in the world important deposits of such low grade nickel ores. Chemical or metallurgical methods are now known for treating them to extract the nickel therefrom but such methods are very costly.

An object of the present invention is to provide a process for recovering nickel from such ores in a relatively economical manner and in such a way as to produce ferro-nickel of high nickel content of the order of 25 to 60% nickel for instance, the nickel content usually being between about 25 and 40%. Such ferro-nickel alloys may be used as substitutes for pure nickel in almost every instance where nickel is employed in steel making processes.

Applicant's Patent 2,100,265 granted November 23, 1937, discloses a process for introducing nickel into a steel bath by violently intermixing such bath with a slag containing nickel oxide. A particularly convenient operating method consists in violently pouring the molten steel into a ladle containing the slag. The reaction is practically instantaneous. Such process is quite suitable if only small amounts of nickel are to be introduced into steel from slags containing relatively large proportions of nickel oxide. However, it is not suitable for introducing large amounts of nickel into steel from low grade nickel ores containing small proportions of nickel oxide.

According to the example given in the patent, a charge of 15,000 kgs. of molten steel is poured into a ladle containing 1,750 kgs. of molten slag containing oxide of the alloying metal. Using these proportions but substituting an ore containing 10% of nickel oxide for the slag, it is possible to introduce about 0.9% of nickel into the steel. If the ore contains 5% of nickel oxide, the amount of nickel introduced into the steel is about 0.4% and if the ore contains 1.5% of nickel oxide, the amount of nickel introduced into the steel is about 0.14%. It will be seen that according to the method of the patent, only a relatively small amount of nickel can be introduced into the steel if a low grade nickel ore is employed.

An object of the present invention, on the contrary, is to start with a low grade nickel ore containing not over about 10% nickel oxide, usually not over about 6% of nickel oxide, and often containing only about 1.5% nickel oxide, and to extract from this ore almost the whole nickel content and to recover it in the form of a high grade alloy containing at least 25% of nickel, usually from 25 to 40% of nickel, which can be used for introducing nickel in steel making or other metallurgical processes.

As stated above, if the proportions of steel and slag disclosed in the example of Patent 2,100,265 are used in the treatment of a low grade nickel ore containing 1.5% nickel oxide, the process results in introducing into the steel only about 0.14% of nickel. Such alloy because of its low nickel content is entirely unsuitable for steel making purposes, particularly for the manufacture of nickel-chromium stainless steels, which require large amounts of nickel. On the other hand, if it is desired to produce from this ore a high grade nickel alloy suitable for steel making and containing, say, 25% of nickel by the single violent intermixing of the molten ore and molten steel as taught in this patent, the weight of steel used must be very small in comparison with the weight of the ore, for instance about 50 kgs. of steel for one ton of ore, which is a ratio of ore to steel of about 20:1. (Throughout this specification, the term "ton" means a metric ton of 1,000 kilograms.) In such case, however, the yield of nickel extracted from the ore decreases considerably, thereby making such treatment economically prohibitive when using these low grade ores.

I have found that a high grade molten ferro-nickel containing 25% or more by weight of nickel, and even upwards of 40% by weight, can be used successfully for effecting substantially complete reduction of nickel oxide in a molten, low grade nickel ore in which the nickel content is much lower than in the ferro-nickel. I have found further that by repeated use of a molten ferrous metal in the treatment of successive quantities of the molten ore, each portion of ore treated thereby can be substantially completely denickelized, and at the same time, the nickel content of the ferrous metal can be progressively increased to a value much above that of the ore itself, and even to a value substantially above 25% by weight.

Based on these findings, the process of the present invention for extracting nickel from low grade oxidic nickel ores comprises forming a molten bath of said ore and vigorously intermixing the molten ore with a quantity of a molten ferrous metal, thereby to reduce nickel oxide from the ore and introduce it into the ferrous metal. In accordance with the invention, the denickelized ore is separated from the molten ferrous metal, and the molten ferrous metal is itself repeatedly intermixed with successive charges of the molten ore. The molten ferrous metal, at least in the later of said repeated intermixings, is a ferro-nickel containing a substantially higher percentage of nickel than is contained in the ore itself. Indeed, the ferro-nickel will eventually contain at least 25% by weight of nickel and may contain as much as 40% or more by weight up to a maximum of about 60% by weight. (If the nickel content of the ferro-nickel exceeds about 60% by weight, it is no longer an effective reducing agent for substantially completely denickelizing molten low grade oxidic nickel ores). The quantity of ferrous metal or ferro-nickel used in the treatment of each quantity of molten nickel ore will always contain a substantially greater weight of iron than the weight of nickel in the ore, in order to insure substantially complete reduction of the nickel oxide. Indeed, it is preferable to employ an amount of ferrous metal or ferro-nickel which is in the range from about ⅓ to about 3 times the weight of molten ore, and most advantageously the ratio of the weight of the ferrous metal or ferro-nickel to the weight of molten ore treated thereby is in the range from ½ to 2. For many ores, the weight of the ore should be approximately equal to the weight of the metal by which it is treated.

If the ore is very low in nickel oxide, it is advisable to use a relatively small amount of ore and a relatively large amount of metal, thereby insuring a good exhaustion of the ore. For example, a 0.30% nickel loss in the exhausted ore bears a much greater relative importance in the final cost of the ferro-nickel obtained, if one starts from an ore containing, say, 1.2% of nickel oxide, than if one starts from an ore containing, say, 4% of nickel oxide. Preliminary tests will in any case help determine the optimum amount of ore to be used with a given weight of metal.

In carrying out my process, the molten ore and molten steel or other ferrous metal are violently intermixed. The iron of the bath reduces the nickel oxide of the ore to nickel which enters the bath. In some cases, a small amount of a strong reducing agent such as ferro-silicon or ferro-aluminum is introduced into the metal bath prior to or during mixing. Whether or not a reducing agent is introduced into the metal bath, the denickelized ore is separated from the metal bath after the intermixing and the metal bath is repeatedly intermixed with successive further charges of molten low grade nickel ore under the conditions as described, including removing the denickelized ore between mixings. The operation is repeated as many times as necessary until the required nickel content of the bath has been reached, after which the metal bath is removed partially or totally.

Owing to the low nickel content of the ore, a considerable number of pourings or other forms of violent intermixings are required in order to secure, from pure iron, a ferro-alloy having a high enough nickel content to make it suitable for steel making purposes. These repeated pourings cool the metal, and in order to overcome this, the ore may be heated to a temperature not only sufficient to melt it but to provide sufficient heat to compensate for the heat lost during the repeated pourings. Similarly, the ferrous metal bath can be heated to an excess temperature in order to compensate for heat losses during the pouring operations or both the metal bath and the ore can be heated to provide the excess heat required in order to carry out the operation. Another way of providing additional heat to compensate for heat losses during the repeated pourings is to add a strong exothermic reducing agent to the metal bath.

The ore can be melted for instance in a reverberator furnace, in a rotating furnace, or in an electric furnace, but in any event, it must be brought to a temperature to make it fluid.

The successive intermixings of molten metal and molten ore can be made by pouring the molten metal into a bath of molten ore contained in a ladle or other receiver. It can be made by simultaneously pouring both the molten metal and the molten ore into the same receiver. In either case, there is a dispersion of the metal into substantially all of the ore which causes the two materials to approach substantial equilibrium by the end of the pouring operation.

In one embodiment of the invention, a steel bath containing no nickel or only a small amount of nickel is violently intermixed with molten low grade nickel ore. The denickelized ore is removed from the metal bath and the bath is treated repeatedly with successive charges of fresh low grade nickel ore, each treatment involving a violent intermixing of the two materials. In carrying out these repeated intermixings of molten ore and molten metal, there may be added to the molten metal prior to each intermixing or prior to at least some of the intermixings, an exothermic reducing agent which may be silicon, aluminum or carbon or alloys thereof, in amount sufficient to maintain the bath at the desired temperature during the various intermixings. At each intermixing, nickel oxide of the ore is reduced to nickel, which enters the bath, thereby enriching it. After the content of nickel in the ferrous metal bath has reached the desired point, the bath is allowed to solidify or else it is used in the liquid state, as for example by adding it to a suitable steel bath for making 18–8 stainless steel.

In another embodiment of the process, I may start with an iron-nickel alloy already containing a large nickel content, for instance of the order of 35%. This molten alloy is first violently intermixed with molten low grade nickel ore. During this first intermixing, the nickel oxide of the ore is reduced to nickel and enters the alloy bath, thereby enriching it slightly. The exhausted nickel ore is then removed from the alloy bath. The intermixing operation is repeated again, using the same alloy bath with a further charge of molten nickel ore. A weight of alloy bath corresponding substantially to the surplus metal introduced into the bath from the ore is drawn off from the bath, thus obtaining a high grade nickel alloy. The previous operation is repeated with the remainder of the alloy bath, intermixing it with a new charge of molten ore and drawing off the exhausted ore, and this cycle, including the drawing off of a portion of the alloy bath, is repeated indefinitely. However, one must take care not to let the nickel content of the alloy rise to too high a value, say over 60% nickel, since, if this occurs, the reduction of the nickel oxide in the ore by the alloy bath, will not result in adequate exhaustion of the ore. In order to prevent the nickel content of the bath from reaching too high a value, iron is introduced into the bath. Iron can be introduced into the bath in either one of the following two ways or by a combination of both. According to one way, a direct addition of iron is made to the bath. Another way is to utilize an ore containing iron oxide in addition to nickel oxide, or by adding iron oxide to a nickel oxide ore. A reducing agent, for example silicon or aluminum or their alloys, is added to the metal bath. During intermixing of the molten ore and molten metal, the reducing agent reduces iron oxide in the ore to iron which enters the metal bath. The reducing agent is employed in such amount as to reduce at least some of the iron oxide of the ore. In this manner, iron resulting from reduction of iron oxide in the ore enters the bath and prevents the nickel content of the bath from reaching too high a value.

In the case where iron or iron oxide in solid form is added to the metal bath, extra heat must be supplied in order to heat and melt these introduced elements. This extra heating may be accomplished by suitable reheating of the metal bath and/or the ore, and/or by an appropriate addition of the reducing agent. The reducing agent in this case must be of such character and used in such amount that the heat liberated by its reaction with the oxides will be great enough to heat and melt the metal or oxide added and to compensate for the heat losses occurring during the operation of the process. Ferro-silicon is particularly suitable for use as a reducing agent because it is not only a strong reducing agent but also provides iron.

The intermixing of the molten ferrous metal and the molten nickel ore can be accomplished by a pouring operation involving the use of a ladle, or it can be accomplished by the use of a rotating or oscillating furnace. If a rotating or oscillating furnace is employed, a ferrous metal bath may be obtained by reducing slag rich in iron oxide and nickel oxide with a strong reducing agent such as silicon or silico-aluminum. In producing this ferrous metal bath, the furnace need not be rotated or oscillated. After the slag has been drawn off, a low grade nickel ore in molten state is added to the ferrous metal bath and the mixture is violently intermixed by rotating or oscillating the furnace. Thereafter, the exhausted ore is removed from the furnace, a portion of the ferrous metal bath is withdrawn from the furnace, and the remainder of the ferrous metal bath is treated with a further quantity of low grade nickel ore. These steps are repeated indefinitely until the desired amount of ferro-nickel has been withdrawn from the furnace. Thus it is possible to carry out all of the operations with only one furnace. The process can be started and continued without the need for any electric power, this being particularly useful where electric power is expensive or unavailable.

It will be noted that in one embodiment of the process, the starting metallic bath is substantially pure iron, whereas in another embodiment, the metallic bath used at the start of the operation contains a large nickel content. These two procedures can be combined. Thus, for instance, one can start with a metallic bath of substantially pure iron, enrich it in nickel content by successive intermixings with further quantities of nickel ore and withdrawal of the exhausted ore until a bath containing, say, 40% nickel is obtained. Thereafter, one-half of the metal bath is withdrawn, an amount of pure iron equal in weight to that withdrawn from the bath is added to the remaining portion of the bath, thereby giving a bath containing 20% of nickel. This bath is then enriched by treating it with successive charges of molten low grade nickel ore until the bath contains a nickel content of 40%. These steps may be repeated indefinitely.

The following examples further illustrate my process.

*Example 1*

The ore treated was a New Caledonian ore containing:

| | Percent |
|---|---|
| NiO | 5 |
| FeO | 25 |
| SiO$_2$ | 40 |
| MgO | Balance |

One ton of the molten ore was poured into a ladle and then two tons of molten ferro-nickel containing 35% nickel were violently poured into the molten ore in the ladle. The reaction between ore and metal was almost instantaneous and was practically complete; the NiO content of the ore fell to 0.20%. The resulting iron-nickel alloy amounted to about two tons and contained 36.5% nickel.

The exhausted molten ore was removed from the iron-nickel alloy bath and then 25 kgs. of ferro-silicon containing 75% silicon were added to the metal bath. This slightly lowered the nickel content of the bath. The bath was then intermixed with a new one ton charge of the ore. The bath of iron-nickel alloy then amounted to 2,075 kgs. and contained about 36.8% nickel. 75 kgs. of this alloy were withdrawn from the bath and the operation was repeated on the remaining metal with an addition of ferro-silicon. This resulted in a little more than two tons of metal. The surplus metal was removed and the operation was carried on for a further period. After about 10 operations, ten tons of ore had been denickelized in this manner and about 700 kgs. of a 37% nickel alloy had been drawn off.

*Example 2*

In this example, a Cuban ore containing a very low content of nickel oxide was used. The ore contained:

| | Percent |
|---|---|
| NiO | 1.5 |
| FeO | 35 |
| SiO$_2$ | 35 |
| MgO | Balance |

Two tons of the molten ore were poured into a ladle and then two tons of a 25% Ni ferro-nickel to which had been added 25 kgs. of a 75% Si ferro-silicon were violently poured into the ore in the ladle. The NiO content of the ore dropped to 0.15% and about 2,070 kgs. of an alloy containing about 25% nickel were obtained.

The denickelized ore was withdrawn from the bath and the bath, after a further like addition of ferro-silicon, was violently intermixed with a further quantity of the ore. After the two intermixings, the bath amounted to 2,140 kgs. of iron-nickel alloy containing about 25% nickel. 140 kgs. of the bath were withdrawn and the operation was resumed with the remaining two tons of metal for treating a further molten charge of the ore. This operation may be carried on indefinitely.

In accordance with another embodiment of the invention, molten ore and molten ferrous metal, for example iron or ferro-nickel, are placed in a receiver and the mixture of the two materials is blown by a current of gas so as to create a strong intermixing between the ferrous metal and the ore. In carrying out this blowing operation, a Bessemer converter may be employed, preferably a bottom blow converter.

The gas employed may be neutral or reducing. Contrary to all expectations, I have found also that air is equally suitable in spite of its oxdizing character toward the metal. Where air is used as the gas, part of the iron of the bath and part of the reducing elements which may be added to the iron bath are oxidized by the air, but this does not prevent the remaining iron or reducing agents from reducing nickel oxide in the ore to very low values. This is particularly true where the duration of the blowing is short. In practice, a few seconds of violent blowing are sufficient. Where silicate ores are treated, the lining of the converter preferably is acid.

During blowing with air or other oxidizing gas, a small amount of iron is oxidized, thus providing additional heat and lowering somewhat the iron content of the bath. This additional heat helps to compensate for the heat losses occurring during the operation. However, it is advisable to introduce into the metallic bath a small amount of a strong exothermic element which is more easily oxidized than iron. This element may be, for example, carbon, manganese, silicon or silicon alloy. These are oxidized by the action of the air together with the action of the ore which is mixed with the metallic bath. In order to protect the acid lining of the blowing apparatus against attack by the bath, particularly where silicate ores are being used, it is advisable to introduce into the metallic bath, before blowing, a small amount of silicon or silicon alloy. The amount of this reducing agent is proportioned so that, during the blowing operation, silicate of iron is formed. If manganese has been added to the bath, the amount of silicon or silicon alloy should be sufficient also to form manganese silicate. The reactivity of these silicates with acid linings is very slight.

Where intermixing of the metal bath and molten ore is accomplished by blowing a gas through the mixture, the proportion of ore to metal bath can be considerably increased, as compared to an intermixing performed by a pouring operation. Thus in intermixing by pouring, it is desirable, although not absolutely essential, that the weight of the ore be not substantially greater than the weight of the metal bath. However, where the intermixing is obtained by blowing a gas through the mixture, the weight of the ore can easily amount to 2 or more times the weight of the metal. This greatly reduces the number of intermixings required for exhausting the same amount of ore of its nickel content. The proportions of ore and metal will vary somewhat according to the strength of the blowing and the nature of the apparatus which is used. Other conditions being equal, the stronger the blowing, the greater may be the amount of ore.

Air blowing, as a consequence of the slight oxidation of iron, results in alloys which are richer in nickel than those obtained by mere pouring. Also, it is possible, once a particular nickel content has been obtained in the alloy, to further increase this nickel content by blowing the alloy with air, but this time not employing any ore. In this way, a substantial proportion of iron may be oxidized and passes into the slag without prohibitive concomitant nickel losses.

The following is an example of an embodiment of the invention in which a bath of molten ore and ferrous metal is blown with air.

*Example 3*

The ore treated was a low nickel Cuban ore containing:

| | Percent |
|---|---|
| NiO | 1.5 |
| FeO | 35 |
| SiO$_2$ | 35 |
| MgO | Balance |

Two tons of the molten ore and one ton of molten iron were loaded into a bottom blow acid lined converter while the converter was on its side. 7 kgs. of ferro-silicon containing 75% silicon were added to the mixture in the converter, the converter was raised, and about 10 cubic meters of air were blown in 10 seconds. The converter was lowered, and the metal was allowed to separate from the molten ore. The molten ore, after separation from the metal, contained 0.17% NiO. The remaining metal contained about 2% nickel.

7 kgs. of ferro-silicon containing 75% silicon were added to the metal in the converter and the metal was used to treat a new two ton charge of ore in the manner described. These operations were repeated many times. After 15 operations, the metal bath weighed 950 kgs. and contained about 30% of nickel.

In another embodiment of the invention, the molten iron or molten ferro-nickel contains a small amount of carbon, and the intermixing of the metal with the molten ore is obtained by pouring the molten metal into the molten ore, or by the simultaneous pouring of both the molten metal and the molten ore into a ladle or other receiver. The action of the carbon on the ore creates a strong bubbling which aids in mixing the two materials. The carbon reacts with the iron and nickel oxides contained in the molten ore, liberating carbon monoxide which causes bubbling of the mixture. The pouring must not be so violent as to cause the mixture to overflow from the ladle. If the pouring is made rather slowly, the carbon monoxide released causes rather strong bubbling of the liquid bath without overflow from the ladle and provides a protracted contact time between the metal globules and the molten ore, thus promoting an almost total exhaustion of the nickel oxide in the ore. The mass of metal used in one operation for treating a given quantity of ore may be lower than where intermixing is accomplished by pouring without bubbling.

The amount of carbon introduced or contained in the metal bath may be small, say 0.2 to 0.5%. Some carbon can be added between successive intermixings, if the bath becomes too poor in carbon so that bubbling no longer is strong enough.

Other reducing elements can also be added, such as aluminum or silicon or their alloys, in order to increase the exothermicity of the reducing reaction. However, the bubbling may be decreased or delayed due to the stronger reducing action of the aluminum or silicon on the nickel and iron oxide in the ore.

The metal bath which is used for treating successive charges of molten ore may be either iron containing carbon or ferro-nickel containing carbon. The latter can be obtained by reduction of nickel ore or slag with carbon or by any other means.

The following is an example of this embodiment of the invention.

*Example 4*

The ore treated contained:

| | Percent |
|---|---|
| NiO | 5.7 |
| FeO | 25 |
| SiO$_2$ | 40 |
| MgO | Balance |

Two tons of this molten ore were tapped into a ladle. Carbon in the amount of 0.3% and silicon in the amount of 0.15% were added to a two ton bath of ferro-nickel containing 32% nickel, and this bath was then cautiously poured into the molten ore in the ladle. The pouring lasted about 5 minutes and caused a strong bubbling of the mixture. The ore and the metal were allowed to separate and the exhausted ore was removed from the metal. The ore contained only 0.15% NiO. The metal contained 36.30% nickel. The silicon and carbon were practically wholly oxidized.

These operations were repeated many times, using the same metal and two ton charges of new ore, and adding to the metal before each pouring 0.2% carbon and 0.15% silicon. After five pourings, ten tons of ore had been exhausted of its nickel content. The weight of the metal had increased slightly, and its nickel content was 52%.

The invention is not limited to the preferred embodiments, but may be otherwise embodied or practiced within the scope of the following claims.

I claim:

1. A process of making ferro-nickel from low grade nickel ores containing not over 10% nickel oxide and also containing iron oxide, which comprises forming a molten bath of said ore, separately forming a molten bath of ferro-nickel containing a substantially higher nickel content than the nickel content of the ore, said ferro-nickel bath also containing a reducing agent for iron oxide, violently intermixing said baths of ore and ferro-nickel, the bath of molten ferro-nickel containing a substantially greater weight of iron than the weight of nickel in the ore, the amount of said reducing agent for iron oxide being such as to reduce iron from the ore in about the same proportion to the nickel reduced therefrom as the proportion of iron to nickel in the ferro-nickel, whereby the weight of ferro-nickel is increased while its percentage content of nickel is maintained substantially constant, withdrawing a portion of the ferro-nickel, and utilizing the remainder of the ferro-nickel for the treatment of a further quantity of said molten ore.

2. A process of making ferro-nickel from low grade nickel ores containing not over 10% nickel oxide and also containing iron oxide, which comprises forming a molten bath of said ore, separately forming a molten bath of ferro-nickel containing a substantially higher content of nickel than the nickel content of the ore, said ferro-nickel also containing a reducing agent for iron oxide, violently intermixing said baths of ore and ferro-nickel, the bath of molten ferro-nickel containing a substantially greater weight of iron than the weight of nickel in the ore, said reducing agent being in amount sufficient to reduce iron oxide in the ore and introduce it into the ferro-nickel bath to maintain the concentration of nickel in the ferro-nickel at not over 60%, and repeatedly intermixing the same bath of molten ferro-nickel with successive charges of said molten ore, said ferro-nickel bath having quantities of said reducing agent added to it prior to at least some of the successive intermixings to maintain the concentration of the nickel in the ferro-nickel at not over 60%.

References Cited in the file of this patent

UNITED STATES PATENTS

| 1,059,709 | Byrnes | Apr. 22, 1913 |
| 2,031,152 | Feild | Feb. 18, 1936 |
| 2,049,721 | Perrin | Aug. 4, 1936 |
| 2,100,265 | Perrin | Nov. 23, 1937 |
| 2,374,396 | Urban | Apr. 25, 1945 |
| 2,573,153 | Lichty | Oct. 30, 1951 |

FOREIGN PATENTS

| 269,133 | Great Britain | Mar. 22 1928 |